United States Patent
Ito et al.

(10) Patent No.: US 8,293,810 B2
(45) Date of Patent: Oct. 23, 2012

(54) RAPID PROTOTYPING RESIN COMPOSITIONS

(75) Inventors: Takashi Ito, Yokohama (JP); Tsuneo Hagiwara, Yokohama (JP); Toshiyuki Ozai, Gunma-ken (JP); Takeshi Miyao, Gunma-ken (JP)

(73) Assignees: Cmet Inc., Yokohama-Shi (JP); Shin-Etsu Chemical Co., Ltd., Tokyo (JP)

( * ) Notice: Subject to any disclaimer, the term of this patent is extended or adjusted under 35 U.S.C. 154(b) by 226 days.

(21) Appl. No.: 11/212,711

(22) Filed: Aug. 29, 2005

(65) Prior Publication Data

US 2007/0049652 A1    Mar. 1, 2007

(51) Int. Cl.
| | |
|---|---|
| C08F 283/12 | (2006.01) |
| C08F 2/50 | (2006.01) |
| C08J 3/28 | (2006.01) |
| G03F 7/031 | (2006.01) |
| C08G 77/04 | (2006.01) |
| C08G 77/20 | (2006.01) |
| C08L 83/07 | (2006.01) |

(52) U.S. Cl. ............. 522/148; 522/99; 522/172; 522/8; 522/46; 528/22; 528/32; 528/33; 524/860

(58) Field of Classification Search ............... 522/99, 522/79, 148, 172, 8, 46; 106/287.13; 556/465; 528/22, 32, 33; 524/860
See application file for complete search history.

(56) References Cited

U.S. PATENT DOCUMENTS

| | | | |
|---|---|---|---|
| 4,575,330 A | 3/1986 | Hull | |
| 4,810,731 A * | 3/1989 | Hida et al. | 522/33 |
| 4,889,905 A | 12/1989 | Suzuki | |
| 4,929,402 A | 5/1990 | Hull | |
| 4,935,455 A | 6/1990 | Huy et al. | |
| 4,942,060 A | 7/1990 | Grossa | |
| 4,942,066 A | 7/1990 | Fan et al. | |
| 5,014,207 A | 5/1991 | Lawton | |
| 5,174,943 A | 12/1992 | Hull | |
| 5,236,637 A | 8/1993 | Hull | |
| 5,302,627 A * | 4/1994 | Field et al. | 522/13 |
| 5,344,298 A | 9/1994 | Hull | |
| 5,530,076 A * | 6/1996 | Eguchi et al. | 525/478 |
| 5,554,336 A | 9/1996 | Hull | |
| 5,556,590 A | 9/1996 | Hull | |
| 5,569,431 A | 10/1996 | Hull | |
| 5,571,471 A | 11/1996 | Hull | |
| 5,573,722 A | 11/1996 | Hull | |

(Continued)

FOREIGN PATENT DOCUMENTS

EP    0 781 814 A2    7/1997

(Continued)

OTHER PUBLICATIONS

Japanese Notice of Rejection issued on Nov. 17, 2010 for Japanese Application No. 2004-181593.

*Primary Examiner* — Michael Pepitone

(74) *Attorney, Agent, or Firm* — Birch, Stewart, Kolasch & Birch, LLP

(57) ABSTRACT

A resin composition suited for rapid prototyping is provided comprising (I) an actinic energy radiation-curable silicone composition, (II) an actinic energy radiation-sensitive polymerization initiator, and (III) an actinic energy radiation absorber. The resin composition experiences little viscosity buildup and maintains fluidity during long-term storage at elevated temperature, and is effective in rapid prototyping or shaping by stereolithography using any actinic energy radiation.

24 Claims, 2 Drawing Sheets

U.S. PATENT DOCUMENTS

| | | | |
|---|---|---|---|
| 5,591,783 A | 1/1997 | Kobayashi et al. | |
| 5,630,981 A | 5/1997 | Hull | |
| 5,684,113 A * | 11/1997 | Nakanishi et al. | 528/30 |
| 5,762,856 A | 6/1998 | Hull | |
| 5,779,967 A | 7/1998 | Hull | |
| 5,785,918 A | 7/1998 | Hull | |
| 5,814,265 A | 9/1998 | Hull | |
| 5,877,228 A | 3/1999 | Mine | |
| 5,952,397 A * | 9/1999 | Fujiki et al. | 522/99 |
| 6,013,693 A | 1/2000 | Takahashi et al. | |
| 6,027,324 A | 2/2000 | Hull | |
| 6,162,576 A | 12/2000 | Hagiwara et al. | |
| 6,846,852 B2 * | 1/2005 | Allen et al. | 522/99 |
| 2002/0113334 A1* | 8/2002 | Matsuoka et al. | 264/152 |
| 2003/0064232 A1* | 4/2003 | Allen et al. | 428/447 |
| 2004/0142276 A1* | 7/2004 | Arai et al. | 430/270.1 |
| 2006/0213868 A1* | 9/2006 | Siddiqui et al. | 216/88 |

FOREIGN PATENT DOCUMENTS

| | | | |
|---|---|---|---|
| EP | 0 802 234 A2 | 10/1997 | |
| EP | 0831127 A1 * | 3/1998 | |
| GB | 2 180 547 A | 4/1987 | |
| JP | 56-144478 A | 11/1981 | |
| JP | 60-247515 A | 12/1985 | |
| JP | 62-35966 A | 2/1987 | |
| JP | 1-204915 A | 8/1989 | |
| JP | 2-113925 A | 4/1990 | |
| JP | 2-145616 A | 6/1990 | |
| JP | 2-153722 A | 6/1990 | |
| JP | 3-15520 A | 1/1991 | |
| JP | 3-21432 A | 1/1991 | |
| JP | 3-41126 A | 2/1991 | |
| JP | 3-74463 A | 3/1991 | |
| JP | 5-222143 A | 8/1993 | |
| JP | 6-322272 A | 11/1994 | |
| JP | 7-216232 A | 8/1995 | |
| JP | 7-228780 A | 8/1995 | |
| JP | 8-59843 A | 3/1996 | |
| JP | 8-231732 A | 9/1996 | |
| JP | 9-169827 A | 6/1997 | |
| JP | 10-95920 A | 4/1998 | |
| JP | 10-100166 A | 4/1998 | |
| JP | 11-12556 A | 1/1999 | |
| JP | 11-60953 A | 3/1999 | |
| JP | 11-228702 A | 8/1999 | |
| JP | 2002-371261 A | 12/2002 | |
| JP | 2003-213132 A | 7/2003 | |
| WO | WO-03/037606 A1 | 5/2003 | |

* cited by examiner

US 8,293,810 B2

RAPID PROTOTYPING RESIN COMPOSITIONS

TECHNICAL FIELD

This invention relates to a resin composition suitable for use in rapid prototyping or stereolithography technique to form three-dimensional objects having improved rubber physical properties.

BACKGROUND ART

Recently, a technique of optically forming a three-dimensional object from a photo-curable liquid resin composition on the basis of data output from a three-dimensional CAD system is on widespread use because the desired three-dimensional object can be manufactured at satisfactory dimensional precision without a need for molds or the like. This technique is broadly referred to as rapid prototyping and specifically as stereolithography. With respect to this technique, JP-A 56-144478 (Kodama) disclosed a method of forming a three-dimensional object by supplying a required amount of optical energy to a photo-curable resin, and JP-A 60-247515 established a practically acceptable method. Thereafter, similar or improved techniques were proposed as disclosed in JP-A 62-35966 corresponding to U.S. Pat. Nos. 4,575,330, 4,929,402, 5,174,943, 5,236,637, 5,344,298, 5,554,336, 5,556,590, 5,569,431, 5,571,471, 5,573,722, 5,630,981, 5,762,856, 5,779,967, 5,785,918, 5,814,265 and 6,027,324, JP-A 1-204915, JP-A 2-113925, JP-A 2-145616, JP-A 2-153722, JP-A 3-15520 corresponding to U.S. Pat. No. 4,942,066, JP-A 3-21432 corresponding to U.S. Pat. No. 5,014,207, and JP-A 3-41126 corresponding to U.S. Pat. No. 4,942,060.

A typical method of optically manufacturing a three-dimensional object involves selectively irradiating an ultraviolet laser beam to the surface of liquid photo-curable resin contained in a vat under the control of a computer to harden the photo-curable resin so that a photo-cured resin layer having a predetermined thickness is obtained, then supplying a layer of liquid photo-curable resin onto the cured resin layer and then likewise irradiating an ultraviolet laser beam to the liquid photo-curable resin layer to form a cured resin layer contiguous to the previous one, and repeating the laminating operations until a desired three-dimensional object is obtained. Great attention has recently been paid to this rapid prototyping technique because a three-dimensional object of complex configuration can be formed with ease and within a relatively short time.

To actinic energy radiation-curable resin compositions for use in the rapid prototyping are imposed many requirements including high cure sensitivity to actinic energy radiation, good resolution of a shaped object, high precision of shaping, a minimal volume shrinkage factor upon curing, good mechanical properties of cured product, good self-adherence, good curing properties in an oxygen-containing atmosphere, a low viscosity, resistance to water or moisture, minimal absorption of water or moisture with time, and dimensional stability. Prior art resin compositions known to be used in the rapid prototyping include photo-curable acrylate resin compositions, photo-curable urethane-acrylate resin compositions, photo-curable epoxy resin compositions, photo-curable epoxy-acrylate resin compositions, and photo-curable vinyl ether resin compositions.

There is a need for resins which when processed by the rapid prototyping technique, exhibit "rubber-like property," that is, the nature that they easily undergo deformation, without rupture, under an applied stress and resume the original shape after the stress is relieved. However, the structures obtained by curing these resins are basically rigid and exhibit the nature that they fail when a stress above a certain level is applied.

There is commercially available only one system, referred to as "elastomer-like," in which a softener component is admixed with a photo-curable urethane-acrylate resin composition in order for the composition to approach the "rubber-like property" (see JP-A 9-169827). The cured product of this resin exhibits soft properties like ordinary rubber, but non-elastic properties of not resuming the original shape even after stress relief.

A number of materials that exhibit rubber elasticity independently of photo-curing are used in the industry. Typical examples include ethylene-propylene rubber, butadiene rubber, polyurethane rubber, silicone rubber, and fluoro-rubber. However, the resin which cures into a practically acceptable state upon exposure to actinic energy radiation is limited to the silicone rubber. For UV-curable organopolysiloxanes in particular, many examples are disclosed in several patents:

JP-A 6-322272, JP-A 7-216232,
JP-A 11-12556 corresponding to U.S. Pat. No. 6,013,693,
JP-A 11-60953, JP-A 11-228702,
JP-A 2002-371261, JP-A 2003-213132, JP-A 8-059843,
JP-A 8-231732 corresponding to U.S. Pat. No. 5,877,228
JP-A 5-222143,
JP-A 7-228780 corresponding to U.S. Pat. No. 5,591,783.

Although the compositions described in these patents cure upon exposure to actinic energy radiation, their cure rate is yet too slow to apply to the stereolithography so that they could not be used in practical rapid prototyping. Even when they are cured to completion with the time taken therefor being neglected, the resulting rubber model will become embrittled shortly and exhibit no longer rubber elasticity. It would be desirable to have a resin which is amenable to the rapid prototyping or stereolithography and exhibits and maintain rubber elasticity.

SUMMARY OF THE INVENTION

An object of the present invention is to provide a rapid prototyping resin composition of the actinic energy radiation cure type, which has improved storage stability and aging stability prior to exposure to actinic energy radiation, experiences little viscosity buildup during long-term storage at elevated temperature, has high cure sensitivity to actinic energy radiation, typically light, and when exposed to actinic energy radiation, produces in a smooth and efficient manner a cured part which has improved dimensional precision, shaping precision, water resistance, and moisture resistance, and exhibits stable rubber elasticity over a long term, especially elastomeric physical properties as demonstrated by an elastic recovery ratio of at least 80% after elongation of at least 100%.

The inventors sought for materials which exhibit rubber physical properties that lend themselves to rapid prototyping or stereolithography. We have found that a silicone resin composition of the actinic energy radiation cure type, especially a silicone rubber (i.e., organopolysiloxane elastomer) based material comprising an alkenyl-containing organopolysiloxane, a mercapto-containing organopolysiloxane, and preferably an alkenyl-containing MQ resin is an effective rapid prototyping resin, and that an actinic energy radiation-curable resin composition obtained by blending therewith an actinic energy radiation-sensitive polymerization initiator (especially radical polymerization initiator) and an actinic energy radiation absorber is amenable to shaping using actinic energy radiation, typically rapid prototyping or stereolithography. Although the resin composition has high cure sensitivity to actinic energy radiation and rapidly cures when exposed to actinic energy radiation, the resin composition is easy to handle in that it has improved storage stability and aging stability, and when stored for a long time, even at elevated temperature, experiences little viscosity buildup and maintains a flowable state compatible with rapid prototyping.

Upon exposure to actinic energy radiation, the resin composition cures into a photo-cured or rapidly prototyped part which has improved resolution, shaping precision, dimensional precision, mechanical properties and outer appearance, and among the mechanical properties, exhibits improved rubber elasticity as demonstrated by an elastic recovery ratio of at least 80% after elongation of at least 100% which has never been achieved with prior art resins.

The inventors encountered the problem that although the cured part exhibits rubber elasticity immediately after rapid prototyping, it is likely to crack and rupture with the lapse of time, say one month or so. We have found that the type of the specific chemical terminal structure and the amount of the specific actinic energy radiation-sensitive polymerization initiator are crucial factors that dictate the steady development of rubber elasticity. The present invention is predicated on these findings.

According to the invention, there is provided a resin composition for rapid prototyping comprising (I) an actinic energy radiation-curable silicone composition, (II) an actinic energy radiation-sensitive polymerization initiator, and (III) an actinic energy radiation absorber.

In a preferred embodiment, the actinic energy radiation-curable silicone composition (I) comprises (A) an alkenyl-containing organopolysiloxane, (B) a mercapto-containing organopolysiloxane, and optionally, (C) an alkenyl-containing MQ resin.

In a more preferred embodiment, the actinic energy radiation-curable silicone composition (I) comprises (A) an alkenyl-containing organopolysiloxane having the general formula (1):

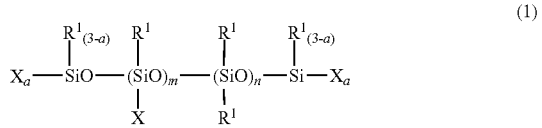

(1)

wherein $R^1$ is a substituted or unsubstituted, monovalent hydrocarbon group of 1 to 10 carbon atoms free of aliphatic unsaturation, X is an alkenyl-containing monovalent organic group, m is an integer of at least 0, n is an integer of at least 100, a is an integer of 0 to 3, with the proviso that m is at least 1 when a=0, said organopolysiloxane containing at least one alkenyl group in a molecule, (B) a mercapto-containing organopolysiloxane having the general formula (2), (3) or (4):

$R^3O-(R^2YSiO)_x-(R^2_2SiO)_y-R^3$ (2)

$R^1_3SiO-(R^2YSiO)_x-(R^2_2SiO)_y-SiR^1_3$ (3)

$[YSiO_{3/2}]_x[R^2_3SiO_{1/2}]_y$ (4)

wherein formulae (2) and (3) are molecular formulae and formula (4) is a compositional formula representing a proportion of siloxane units, $R^1$ is as defined above, $R^2$ is $R^1$ or an alkoxy, trialkylsilyloxy or hydroxy group, $R^3$ is $R^1$ or hydrogen, Y is a mercapto-containing monovalent organic group of 1 to 8 carbon atoms, x is a number of at least 3, and y is a number of at least 0, in a weight ratio of (A)/(B) ranging from 50/50 to 98/2, and (C) an alkenyl-containing MQ resin comprising $R^1_3SiO_{0.5}$ units, $R^1_{(3-a)}X_aSiO_{0.5}$ units and $SiO_2$ units wherein $R^1$, X and a are as defined above, with a molar ratio of $(R^1_3SiO_{0.5}+R^1_{(3-a)}X_aSiO_{0.5})/SiO_2$ ranging from 0.6 to 1.7, in a weight ratio of (A+B)/(C) ranging from 100/200 to 100/10.

Typically, the actinic energy radiation-sensitive polymerization initiator (II) is an actinic energy radiation-sensitive radical polymerization initiator and present in an amount of 0.1 to 5 parts by weight per 100 parts by weight of the actinic energy radiation-curable silicone composition (I); and the actinic energy radiation absorber (III) is present in an amount of 0.001 to 0.5 part by weight per 100 parts by weight of the actinic energy radiation-curable silicone composition (I).

Upon exposure to actinic energy radiation, the resin composition cures into a product which preferably exhibits such elastomeric physical properties in a tensile test that it has an elongation of at least 100%, resumes the original shape after the tensile stress is relieved, and has a percent elastic recovery L0/L1 of at least 80%, provided that the product has a length L0 before elongation and a length L1 after elongation. More preferably, the cured product exhibits such elastomeric physical properties that it maintains a percent elastic recovery of at least 80% after 100% elongation for a duration of at least one month.

The rapid prototyping resin composition of the invention, even when stored at elevated temperature, experiences little viscosity buildup and maintains fluidity and is thus amenable to modeling or shaping using actinic energy radiation, typically rapid prototyping or stereolithography. Upon exposure to actinic energy radiation, the resin composition cures into a photo-cured (or stereolithography formed) part which has improved resolution, shaping precision, dimensional precision, mechanical properties and outer appearance. Among the mechanical properties, the cured part exhibits improved elastomeric physical properties as demonstrated by a percent elastic recovery L0/L1 of at least 80% (i.e., 80 to 100%), preferably at least 90% (i.e., 90 to 100%), more preferably at least 95% (i.e., 95 to 100%), after elongation of at least 100%, in a steady manner over one month, which has never been achieved with prior art resins.

DESCRIPTION OF THE PREFERRED EMBODIMENTS

Figure 1:
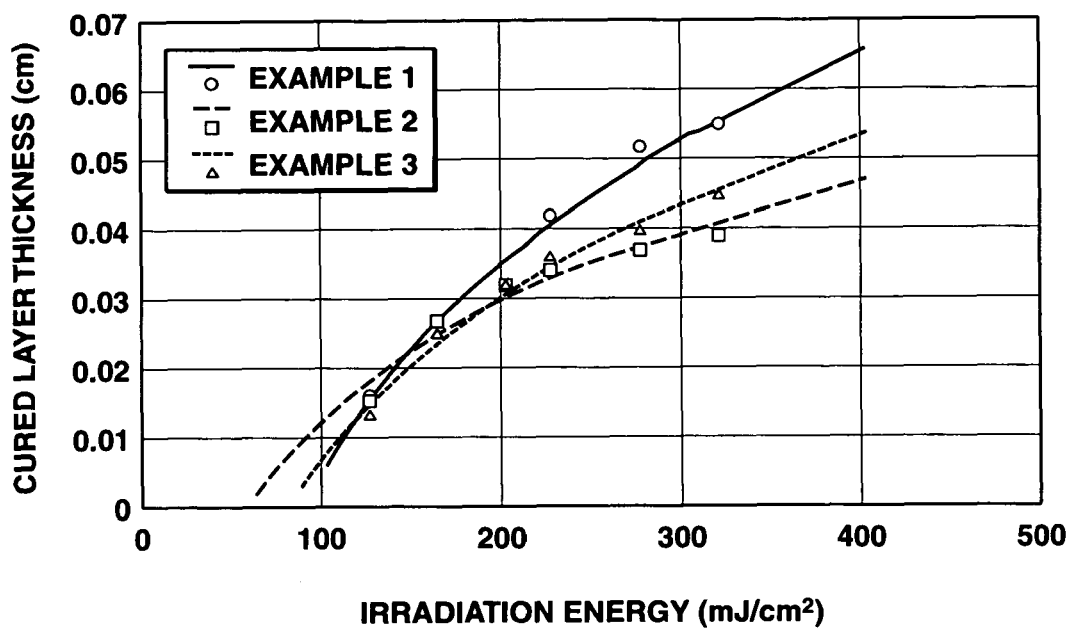
FIG. 1 is a graph plotting cured layer thickness relative to irradiation energy, illustrating the curing behavior of Examples 1 to 3 with laser radiation.

The rapid prototyping resin composition of the invention is defined as comprising (I) an actinic energy radiation-curable silicone composition, (II) an actinic energy radiation-sensitive polymerization initiator, and (III) an actinic energy radiation absorber.

In a preferred embodiment, the actinic energy radiation-curable silicone composition (I) comprises (A) an alkenyl-containing organopolysiloxane, (B) a mercapto-containing organopolysiloxane, and optionally, (C) an alkenyl-containing MQ resin so that exposure to actinic energy radiation induces crosslinkage therein to produce a cured part of silicone rubber (i.e., organopolysiloxane elastomer).

The alkenyl-containing organopolysiloxane (A) is preferably a linear one, that is, a linear diorganopolysiloxane having a backbone consisting of repeating diorganosiloxane units and blocked with triorganosiloxy groups at opposite ends of the molecular chain. The alkenyl group in component (A) may be directly bonded to a silicon atom or linked to a silicon atom via a divalent hydrocarbon group which may contain an ether bond or ester bond. The alkenyl group may be bonded to a silicon atom at the end of the molecular chain or a silicon atom at an intermediate (or non-terminal) position of the molecular chain or both. For the physical properties of the cured part, the preferred organopolysiloxane (A) should have at least an alkenyl group bonded to a silicon atom at the end, more preferably opposite ends of the molecular chain. In component (A), the number of alkenyl groups per molecule should be at least 1, preferably at least 2, typically 2 to about 20. As component (A), those organopolysiloxanes having the following general formula (1) are especially preferred.

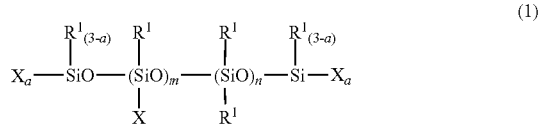

(1)

Herein $R^1$ is a substituted or unsubstituted, monovalent hydrocarbon group of 1 to 10 carbon atoms free of aliphatic unsaturation, X is an alkenyl-containing monovalent organic group, m is an integer of at least 0, n is an integer of at least 100, and a is an integer of 0 to 3, with the proviso that m is at least 1 when a=0. The organopolysiloxane contains at least one, preferably at least two alkenyl groups in a molecule.

Examples of the substituted or unsubstituted, monovalent hydrocarbon group represented by $R^1$ include alkyl groups such as methyl, ethyl, propyl, isopropyl, isobutyl, tert-butyl and butyl, cycloalkyl groups such as cyclohexyl, aryl groups such as phenyl and tolyl, aralkyl groups such as benzyl, and substituted forms of the foregoing groups in which some or all of the hydrogen atoms bonded to carbon atoms are substituted with halogen atoms, hydroxyl groups, cyano groups or the like, such as 3,3,3-trifluoropropyl, hydroxypropyl and cyanoethyl. Of these, methyl and phenyl are most preferred. It is more preferred that methyl and phenyl account for at least 50 mol % and 1 to 20 mol % of the entire $R^1$ groups, respectively. X is selected from alkenyl-containing monovalent organic groups, preferably of 2 to 12 carbon atoms, for example, alkenyl groups which may be separated by an ether bond or ester bond (—O—) or ester bond (—C(=O)—O—). Examples include vinyl, allyl, propenyl, isopropenyl, hexenyl, octenyl, (meth)acryloyloxypropyl, (meth)acryloyloxyethyl, (meth)acryloyloxymethyl, cyclohexenylethyl, and vinyloxypropyl. The amount of alkenyl-containing monovalent organic groups is preferably 0.001 to 10 mol %, more preferably 0.01 to 5 mol % based on the amount of X and $R^1$ combined.

The organopolysiloxane (A) may be oily or gum-like. It preferably has a viscosity at 25° C. of at least 50 mPa·s, more preferably at least 100 mPa·s. The upper limit of viscosity is not critical although the viscosity as measured in a 30 wt % toluene solution should preferably be up to 50,000 mPa·s.

The organopolysiloxane (A) may be a homopolymer having the illustrated molecular structure, a copolymer having the illustrated molecular structures, or a mixture of homopolymers and/or copolymers. A mixture of two or more organopolysiloxanes may be used as component (A).

Component (B) in the silicone composition is a mercapto-containing organopolysiloxane preferably having the general formula (2), (3) or (4). It is understood that formulae (2) and (3) are molecular formulae and formula (4) is a compositional formula representing a proportion of siloxane units.

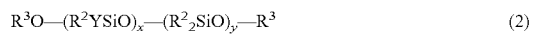

(2)

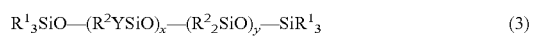

(3)

(4)

Herein $R^1$ is as defined above, $R^2$ is $R^1$ or an alkoxy, trialkylsilyloxy or hydroxy group, $R^3$ is $R^1$ or hydrogen, Y is a mercapto-containing monovalent organic group of 1 to 8 carbon atoms, x is a number of at least 3, and y is a number of at least 0.

Of the groups represented by $R^2$, preferred alkoxy groups are those of 1 to 4 carbon atoms, and preferred trialkylsilyloxy groups are those in which each alkyl moiety has 1 to 6 carbon atoms. Examples of $R^2$ include the groups exemplified above for $R^1$, and alkoxy groups such as methoxy, ethoxy, propoxy, isopropoxy, butoxy, isobutoxy, and tert-butoxy, trialkylsilyloxy groups such as trimethylsilyloxy, and hydroxy, with methyl, phenyl, methoxy and trimethylsilyloxy being preferred. Y is a mercapto-containing monovalent organic group of 1 to 8 carbon atoms, examples of which include mercapto-containing alkyl and aryl groups such as 2-mercaptoethyl, 3-mercaptopropyl, 4-mercaptobutyl, o-mercaptophenyl, m-mercaptophenyl, and p-mercaptophenyl.

It is preferred that the amount of Y be at least 20 mol % (i.e., 20 to 100 mol %), more preferably 30 to 90 mol %, and even more preferably 40 to 80 mol % based on the number of silicon atoms in a molecule.

The subscript x is a number of at least 3, preferably 3 to 50, more preferably 4 to 20, and y is a number of at least 0, preferably 0 to 50, more preferably 0 to 20.

The mercapto-containing organopolysiloxane (B) preferably has a viscosity of about 10 to about 1,000 mPa·s at 25° C.

The mercapto-containing organopolysiloxane (B) may be prepared, for example, by (co)hydrolytic condensation of a mercapto-containing di- and/or tri-functional alkoxysilane such as γ-mercaptopropyltrimethoxysilane or γ-mercaptopropylmethyldimethoxysilane, optionally in the co-presence of a di- and/or mono-functional alkylalkoxysilane such as dimethyldimethoxysilane or trimethylmethoxysilane.

A mixture of two or more mercapto-containing organopolysiloxanes may be used as component (B).

The main curing or crosslinking reaction that takes place in the inventive composition is radical addition reaction of alkenyl groups in component (A) and mercapto groups in component (B). The weight ratio of component (A) to component (B), (A)/(B), preferably ranges from 50/50 to 98/2, more preferably from 70/30 to 95/5. With a ratio (A)/(B) of more than 98/2, the composition may become less curable. With a ratio (A)/(B) of less than 50/50, a formed part having satisfactory physical properties may not be obtained.

If necessary, the silicone composition contains as component (C) an organopolysiloxane resin of three-dimensional network structure (MQ resin) comprising $R^1_3SiO_{0.5}$ units, $R^1_{(3-a)}X_aSiO_{0.5}$ units and $SiO_2$ units wherein $R^1$, X and a are as defined above, with a molar ratio of $(R^1_3SiO_{0.5}+R^1_{(3-a)}X_aSiO_{0.5})/SiO_2$ ranging from 0.6 to 1.7. As used herein, the "MQ resin" means an organopolysiloxane resin of three-dimensional network structure essentially containing triorganosiloxy units (i.e., monofunctional siloxane units) and $SiO_{4/2}$ units. If the molar ratio of $(R^1_3SiO_{0.5}+R^1_{(3-a)}X_aSiO_{0.5})/SiO_2$ is less than 0.6, the shaping ability may decline. If the molar ratio is more than 1.7, the holding power may decline. A mixture of two or more MQ resins may be used as component (C). The MQ resin may contain silanol groups in an amount of up to about 1.5% by weight, calculated as the weight of hydroxy groups.

Preferably the proportion of $R^1_3SiO_{0.5}$ units and $R^1_{(3-a)}X_aSiO_{0.5}$ units is such that the molar ratio of $R^1_{(3-a)}X_aSiO_{0.5}/(R^1_3SiO_{0.5}+R^1_{(3-a)}X_aSiO_{0.5})$ may range from about 0.02 to about 0.3, more preferably from about 0.05 to about 0.2.

The content of alkenyl groups in component (C) is preferably about 0.3 to about 10% by weight, more preferably about 0.5 to about 5% by weight.

The ratio (by weight) of the total of components (A) and (B) to component (C) ranges preferably from 100/200 to 100/10, more preferably from 100/100 to 100/40. With a (A+B)/(C) ratio in excess of 100/10, the rubber may have a low strength. With a (A+B)/(C) ratio of less than 100/200, the composition may have too high a finished viscosity to use in rapid prototyping.

In the practice of the invention, a silicone composition may be obtained by simply admixing components (A), (B) and optionally (C). Alternatively, components (A) and (C) are combined to form a condensation reaction product (equilibration reaction product of siloxanes), which is admixed with component (B) to form a silicone composition. The condensation reaction may be carried out by dissolving components (A) and (C) in a suitable solvent such as toluene, adding an alkaline catalyst thereto, and effecting equilibration reaction at room temperature or under reflux.

Component (II) is an actinic energy radiation-sensitive polymerization initiator, preferably an actinic energy radiation-sensitive radical polymerization initiator. The actinic energy radiation-sensitive radical polymerization initiator (sometimes simply referred to as radical polymerization initiator) is any polymerization initiator capable of initiating radical polymerization of a radical polymerizable organic compound upon exposure to actinic energy radiation. Typical radical polymerization initiators include benzyl and dialkylacetal derivatives thereof, acetophenone compounds, benzoin and alkyl ether derivatives thereof, benzophenone compounds, and thioxanthone compounds.

More specifically, examples of benzyl and dialkylacetal derivatives thereof include benzyl dimethyl ketal, benzyl β-methoxyethyl acetal and 1-hydroxycyclohexyl phenyl ketone. Suitable acetophenone compounds include acetophenone, 4-methylacetophenone, diethoxyacetophenone, 2-hydroxymethyl-1-phenylpropan-1-one, benzyl dimethyl ketal (2,2-dimethoxy-1,2-diphenyl-ethan-1-one), 2,2-diethoxy-1-phenyl-ethan-1-one, 4'-isopropyl-2-hydroxy-2-methyl-propiophenone, 2-hydroxy-2-methyl-propiophenone, p-dimethylaminoacetophenone, p-tert-butyldichloroacetophenone, p-tert-butyltrichloroacetophenone, and p-azidobenzalacetophenone. Examples of benzoin and alkyl ether derivatives thereof include benzoin, benzoin methyl ether, benzoin ethyl ether, benzoin isopropyl ether, benzoin n-butyl ether, and benzoin isobutyl ether. Suitable benzophenone compounds include benzophenone, methyl o-benzoylbenzoate, Michler's ketone, 4,4'-bisdiethylaminobenzophenone, and 4,4'-dichlorobenzophenone. Suitable thioxanthone compounds include thioxanthone, 2-methylthioxanthone, 2-ethylthioxanthone, 2,4-diethylthioxanthone, 2-chlorothioxanthone, and 2-isopropylthioxanthone. Other useful compounds include ethylanthraquinone and 2,4,6-trimethylbenzoyldiphenylphosphine oxide.

Of the radical polymerization initiators, 2-hydroxymethyl-1-phenylpropan-1-one is most preferred because it is liquid at normal temperature, readily dissolvable or dispersible in the silicone composition (I), and easily available. In the practice of the invention, the radical polymerization initiators may be used alone or in admixture of two or more depending on the desired capability.

The radical polymerization initiator (II) is preferably used in an amount of 0.1 to 5 parts by weight per 100 parts by weight of the silicone composition (I). Less than 0.1 pbw of component (II) may fail to produce a satisfactorily formed part. More than 5 pbw of component (II) may produce a formed part which will shortly turn embrittled or lose rubber elasticity and become prone to rupture. The preferred amount of radical polymerization initiator (II) is 0.5 to 5 parts by weight, most preferably 1 to 5 parts by weight per 100 parts by weight of the silicone composition (I).

Component (III) is an actinic energy radiation absorber. Typical of the actinic energy radiation absorber used herein are benzotriazole compounds, benzophenone compounds, phenyl salicylate compounds and cyanoacrylate compounds. These compounds may be used alone or in admixture as the optical energy absorber.

Specifically, those compounds having the general formulae (I), (II), (III) and (IV) in U.S. Pat. No. 6,162,576 (Japanese Patent No. 3,117,394) are preferred. These formulae are reproduced below.

Benzotriazole compounds of formula (I):

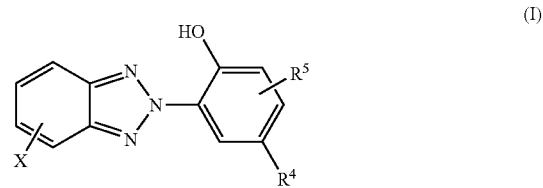

(I)

Herein $R^4$ and $R^5$ are each independently hydrogen, a substituted or unsubstituted straight or branched alkyl group of 1 to 20 carbon atoms, or a substituted or unsubstituted phenyl group, and X is a hydrogen or halogen atom.

Benzophenone compounds of formula (II):

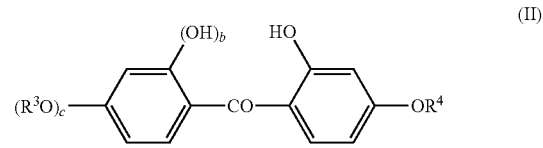

(II)

Herein $R^6$ and $R^7$ are each independently hydrogen, a substituted or unsubstituted straight or branched alkyl group of 1 to 20 carbon atoms, or a substituted or unsubstituted phenyl group, and b and c are each independently 0 or 1.

Phenyl salicylate compounds of formula (III):

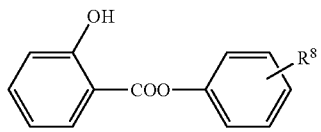

(III)

Herein $R^8$ is hydrogen, a substituted or unsubstituted straight or branched alkyl group of 1 to 20 carbon atoms, or a substituted or unsubstituted phenyl group.

Cyanoacrylate compounds of formula (IV):

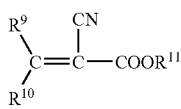

(IV)

Herein $R^9$ and $R^{10}$ are each independently hydrogen, a substituted or unsubstituted straight or branched alkyl group of 1 to 20 carbon atoms, or a substituted or unsubstituted phenyl group, and $R^{11}$ is a substituted or unsubstituted straight or branched alkyl group of 1 to 20 carbon atoms.

Among the above absorbers, 2-(2'-hydroxy-5'-methylphenyl)benzotriazole, 2-[2'-hydroxy-3'-butyl-5'-(2'''-carboxyoctylethyl)phenyl]-benzotriazole, 2-hydroxy-4-methoxybenzophenone, p-methylphenyl salicylate, 2-hydroxy-4-octyloxybenzophenone, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, and 2-(2'-hydroxy-5'-t-octylphenyl)benzotriazole are particularly preferred as well as {benzenepropanoic acid, 3-(2H-benzotriazol-2-yl)-5-(1,1-dimethylethyl)-4-hydroxy-, $C_{7-9}$ branched and linear alkyl esters} because of their high actinic energy radiation absorbency, satisfactory solubility or dispersibility in silicone resin compositions, and availability.

An appropriate amount of the actinic energy radiation absorber (III) compounded is 0.001 to 0.5 part by weight, more preferably 0.005 to 0.25 part by weight, most preferably 0.01 to 0.1 part by weight per 100 parts by weight of component (I). On this basis, less than 0.001 pbw of the absorber may be ineffective for its purpose, failing to manufacture three-dimensional objects having improved dimensional precision, dimensional stability and mechanical properties. If the amount of absorber is more than 0.5 pbw, the resin composition may become impractical in that it cures at a slow rate when processed by stereolithography, leading to a drastically retarded speed of prototyping and a three-dimensional object having poor mechanical properties. Also when the amount of the actinic energy radiation absorber (III) added is determined relative to the amount of the polymerization initiator (II), it is usually preferred to add 0.001 to 0.25 part by weight of the absorber per part by weight of the polymerization initiator (although the exact amount varies depending on the type of a particular polymerization initiator) because three-dimensional objects having improved dimensional precision, shape stability and mechanical properties can be manufactured without a drop of photo-polymerization rate or the like.

On use of a rapid prototyping resin composition comprising the actinic energy radiation-curable silicone composition and a specific amount of the actinic energy radiation absorber, the permissible range of an optical energy quantity irradiated relative to the thickness of a film to be cured is expanded so that it becomes easier and smoother to control the energy quantity within the desired thickness than in the prior art, enabling to manufacture three-dimensional objects having improved dimensional precision and dimensional stability. Additionally, photochemical reactivity can be improved, and the three-dimensional objects manufactured are accordingly improved in mechanical properties. Although it is not well understood why such benefits are manifested, the following reason is presumed. When a specific amount of the actinic energy radiation absorber is added to the actinic energy radiation-curable silicone composition, the actinic energy radiation absorber absorbs part of the energy of actinic energy radiation to adjust and uniformize the penetration depth of optical energy mainly in Z-axis direction, thus making uniform the thickness of a photo-cured layer. At the same time, part of the optical energy absorbed by the absorber is converted into thermal energy, which also participates in the curing of the resin. Thus, although the actinic energy radiation absorber is added, the composition can be formed into a three-dimensional object by rapid prototyping without a slowing of the cure rate of the resin. In this way, a three-dimensional object of quality having improved dimensional precision and dimensional stability is manufactured.

To the rapid prototyping resin composition of the invention, other components may be added as long as the benefits of the invention are not compromised. For example, non-reactive organopolysiloxanes such as dimethylpolysiloxane and dimethyldiphenylpolysiloxane may be compounded.

Also useful are compounds which undergo polymerization reaction and/or crosslinking reaction when exposed to actinic energy radiation in the presence of the actinic energy radiation-sensitive radical polymerization initiator, for example, (meth)acrylate compounds, unsaturated polyester compounds, allyl urethane compounds and polythiol compounds. These radical polymerizable organic compounds may be used alone or in admixture.

A solvent may be added to the composition for reducing its viscosity. Suitable solvents include aromatic solvents such as toluene and xylene, aliphatic solvents such as hexane, octane, and isoparaffin, ketone solvents such as methyl ethyl ketone and methyl isobutyl ketone, ester solvents such as ethyl acetate and isobutyl acetate, and ether solvents such as diisopropyl ether and 1,4-dioxane, and mixtures thereof.

For increasing the cure rate, reaction accelerators may be compounded along with the actinic energy radiation-sensitive radical polymerization initiator. Examples are triethylamine, ethyl p-dimethylaminobenzoate, and N-methyldiethanolamine.

Additionally, suitable amounts of colorants such as pigments and dyes, anti-foaming agents, leveling agents, thickeners, flame retardants, antioxidants, fillers (e.g., silica, powdered glass, powdered ceramics, powdered metals), modifying resins and the like may be added alone or in admixture.

It is preferred that the rapid prototyping resin composition of the invention be liquid at room temperature (25° C.) and typically have a viscosity of 0.1 to 100 Pa·s, more preferably 0.2 to 50 Pa·s, even more preferably 1 to 30 Pa·s, as measured by a rotational viscometer.

The rapid prototyping resin composition of the invention cures upon exposure to actinic energy radiation, typically ultraviolet radiation. The irradiation dose is preferably about 1 to 500 mJ/cm$^2$, more preferably about 10 to 400 mJ/cm$^2$.

Once the composition is cured upon exposure to actinic energy radiation, it may be post-cured with a UV lamp or the like, if necessary.

In optically forming 3D objects from the resin composition of the present invention, any conventional rapid prototyping or stereolithography technique and apparatus can be used. A typical stereolithography method of optically manufacturing a three-dimensional object involves selectively irradiating actinic energy radiation to the surface of the inventive liquid resin composition under the control of a computer so as to form a cured resin layer having a predetermined pattern, then supplying an uncured layer of the inventive liquid resin composition onto the cured resin layer, then likewise irradiating actinic energy radiation to the liquid resin composition layer to form a cured resin layer contiguous to the previous cured resin layer, and repeating the laminating steps until a desired three-dimensional object is obtained. Examples of the actinic energy radiation include ultraviolet (UV) radiation, electron beams, x-rays, and high-frequency radiation. Of these, UV radiation having a wavelength of 300 to 400 nm is preferred from the economical standpoint. Suitable light sources of such radiation include UV lasers (e.g., Ar laser, He—Cd laser, LD-pumped solid state laser), mercury lamps, xenon lamps, halogen lamps, and fluorescent lamps. Of these, laser light sources and mercury lamps are advantageously employed because they can increase an energy level to reduce the forming time and the satisfactory beam-condensing ability ensures a high forming precision.

A cured product obtained by curing the resin composition through exposure to actinic energy radiation manifests excellent elastomeric physical properties. Specifically, it exhibits an elongation of at least 100% in a tensile test. It resumes the original shape after the tensile stress is relieved. It has a percent elastic recovery L0/L1 of at least 80% (i.e., 80 to 100%), preferably at least 90% (i.e., 90 to 100%), more preferably at least 95% (i.e., 95 to 100%), provided that L0 is the length of a specimen before elongation and L1 is the length of that specimen after elongation.

The cured product continuously manifests such elastomeric physical properties in a tensile test that it maintains a percent elastic recovery L0/L1 of at least 80%, preferably at least 90%, more preferably at least 95%, after 100% or more elongation for a duration of at least one month.

When the resin composition of the invention is used in rapid prototyping or stereolithography, the field of application is not particularly limited. Typical fields of application include prototypes or models for verifying the outer appearance in the course of design, and prototypes or models for inspecting the function of parts.

Most potential prototypes or models are those for inspecting the function relating to rubbery elasticity characteristic of the inventive resin composition. Specifically, since the cured resin has good properties enough to use it as a silicone gasket, useful parts include gaskets to be interposed between joint members having unique mating surfaces, supporters and pads to fit any movable region of a human body, attachment members between an artificial leg or hand and a human body, and housings of aural aids. In the primary rapid prototyping field, the invention is useful in the development of tread patterns of automobile tires, and the manufacture of prototypes for working portions of power machines and flexible protective covers on robot joints.

It is understood that the resin composition of the invention can be used not only in optically forming three-dimensional objects by stereolithography, but also in otherwise shaping, coating and covering any articles with the aid of actinic energy radiation.

EXAMPLE

Examples are given below for illustrating the invention, but the invention is not limited thereto. All parts are by weight. Me is methyl, Ph is phenyl, and Vi is vinyl.

The physical properties (tensile strength, tensile elongation, tensile modulus) of actinic energy radiation-cured parts (specimens) were measured according to JIS K-7113.

Also, the elastic recovery and the aged elastic recovery of actinic energy radiation-cured parts (specimens) were measured as follows.

Elastic Recovery Test

A sample having the same shape and size as the dumbbell for the tensile test according to JIS K-7113 was formed from a resin composition by rapid prototyping. An elongation of the sample was measured by the tensile test. Once the sample was elongated to a value of 90% of the maximum measured elongation at break (which was at least 100%), it was allowed to resume the original shape. A percent elastic recovery was calculated as the length L0 of the sample before elongation divided by the length L1 of the sample after elongation and expressed in percentage.

A similarly formed sample was aged for one month before the same tensile test was carried out. This is the measurement of "elastic recovery after one month."

Example 1

The components used in this example are identified below.
(1) Alkenyl-containing organopolysiloxane of the following formula, 70 parts

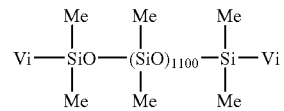

(2) Organopolysiloxane resin of three-dimensional network structure consisting of $Me_3SiO_{0.5}$, $Me_2ViSiO_{0.5}$, and $SiO_2$ units wherein molar ratio $(Me_3SiO_{0.5}+Me_2ViSiO_{0.5})/SiO_2=0.8$, with a vinyl content of 2 wt %, 30 parts
(3) Mercapto-containing organopolysiloxane of the following formula, 8 parts

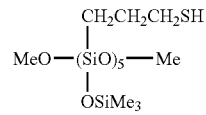

(4) 2-hydroxymethyl-1-phenylpropan-1-one, Darocure® 1173 (Ciba Specialty Chemicals) as the actinic energy radiation-sensitive radical initiator, 2 parts
(5) A 95/5 (by weight) mixture of {benzenepropanoic acid, 3-(2H-benzotriazol-2-yl)-5-(1,1-dimethylethyl)-4-hydroxy-, $C_{7-9}$ branched and linear alkyl esters} and 1-methoxy-2-propyl acetate, TINUVIN® 384-2 (Ciba Specialty Chemicals) as the actinic energy radiation absorber, 0.05 part A rapid prototyping resin composition was prepared by combining components (1) and (2), mixing the mixture of (1) and (2) with component (3), then adding components (4) and (5) to the mixture, and mixing the components until uniform.

A dumbbell sample according to JIS K-7113 was formed from the resin composition by the stereolithography technique using a ultrahigh speed stereolithography system SOLIFORM 500C (Teijin Seiki Co., Ltd.) combined with a LD-pumped solid state laser (power 175 mW, wavelength 355 nm) under conditions of an irradiation energy dose of 20-30 mJ/cm$^2$, a slice pitch (laminating layer thickness) of 0.10 mm, and an average forming time of 2 minutes per layer.

On visual observation, the sample was confirmed to be a distortion-free, precisely configured part. The sample (three-dimensional object or cured part) was taken out of the system, washed with n-hexane to remove any uncured polymer attached thereto, and post-cured for 10 minutes under a UV lamp of 3 kW.

The sample was measured for tensile strength, tensile elongation and tensile modulus according to JIS K-7113, with the results shown in Table 1. The surface hardness (Shore A hardness) of the sample was measured by the durometer method of JIS K-6253, with the results shown in Table 1.

Prior to the rapid prototyping, the relationship of cured depth to irradiation energy was examined as follows.

The cured depth was measured on the basis of the theory described in Paul F. Jacobs, "Rapid Prototyping & Manufacturing, Fundamentals of Stereo-Lithography," Society of Manufacturing Engineers, 1992. While the exposure dose was controlled by changing an image writing speed, a part including six to ten stepwise cured layers was prepared. The cured part was taken out of the uncured liquid resin using a pair of tweezers and washed to remove any uncured resin. The thicknesses of the cured layers corresponding to six to ten exposure doses were measured by means of a constant pressure slide calipers and plotted in FIG. 1. FIG. 2 illustrates a relationship of the thickness of cured layer to a natural logarithm of the irradiation energy given as the exposure dose. The straight lines drawn in FIG. 2 can be said "cured depth curves" inherent to the resins. The gradient of the straight line, designated "Dp," corresponds to the penetration depth of light inherent to the resin. The intersection point between the cured depth curve and x axis that represents the irradiation energy quantity extrapolated at a cured layer thickness of zero is designated critical exposure dose or "Ec." Both Dp and Ec can be interpreted as a resin's own curing characteristics with actinic energy radiation. The values of Dp and Ec calculated from the curves are shown in Table 1.

Example 2

The components used in this example are identified below.
(1) Alkenyl-containing organopolysiloxane of the following formula, 60 parts

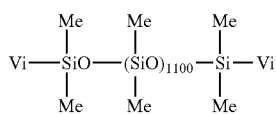

(2) Alkenyl-containing organopolysiloxane of the following formula, 10 parts

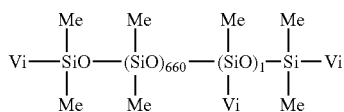

(3) Organopolysiloxane resin of three-dimensional network structure consisting of Me$_3$SiO$_{0.5}$, Me$_2$ViSiO$_{0.5}$, and SiO$_2$ units wherein molar ratio (Me$_3$SiO$_{0.5}$+Me$_2$ViSiO$_{0.5}$)/SiO$_2$=0.8, with a vinyl content of 2 wt %, 30 parts
(4) Mercapto-containing organopolysiloxane of the following formula, 8 parts

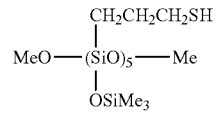

(5) 2-hydroxymethyl-1-phenylpropan-1-one, Darocure® 1173 (Ciba Specialty Chemicals) as the actinic energy radiation-sensitive radical initiator, 2 parts (6) A 95/5 (by weight) mixture of {benzenepropanoic acid, 3-(2H-benzotriazol-2-yl)-5-(1,1-dimethylethyl)-4-hydroxy-, C$_{7-9}$ branched and linear alkyl esters} and 1-methoxy-2-propyl acetate, TINUVIN® 384-2 (Ciba Specialty Chemicals) as the actinic energy radiation absorber, 0.05 part A rapid prototyping resin composition was prepared by combining components (1), (2) and (3), mixing the mixture of (1), (2) and (3) with component (4), then adding components (5) and (6) to the mixture, and mixing the components until uniform.

Figure 2:
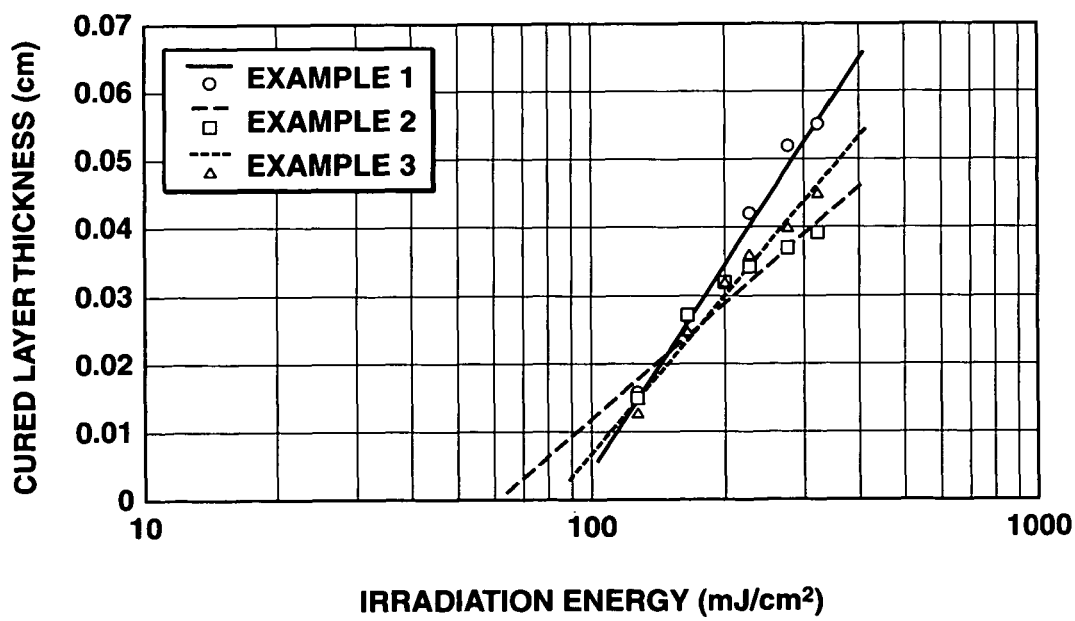
FIG. 2 is a logarithmic graph plotting cured layer thickness relative to irradiation energy, illustrating the curing behavior of Examples 1 to 3 with laser radiation.

The resin composition was evaluated as in Example 1, with the results shown in Table 1 and FIGS. 1 and 2.

Example 3

The components used in this example are identified below.
(1) Alkenyl-containing organopolysiloxane of the following formula, 70 parts

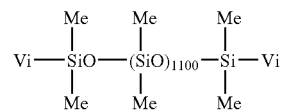

(2) Organopolysiloxane resin of three-dimensional network structure consisting of Me$_3$SiO$_{0.5}$, Me$_2$ViSiO$_{0.5}$, and SiO$_2$ units wherein molar ratio (Me$_3$SiO$_{0.5}$+Me$_2$ViSiO$_{0.5}$)/SiO$_2$=0.8, with a vinyl content of 2 wt %, 30 parts
(3) Mercapto-containing organopolysiloxane of the following formula, 12 parts

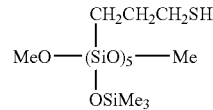

(4) 2-hydroxymethyl-1-phenylpropan-1-one, Darocure® 1173 (Ciba Specialty Chemicals) as the actinic energy radiation-sensitive radical initiator, 2 parts
(5) A 95/5 (by weight) mixture of {benzenepropanoic acid, 3-(2H-benzotriazol-2-yl)-5-(1,1-dimethylethyl)-4-hydroxy-, C$_{7-9}$ branched and linear alkyl esters} and 1-methoxy-2-propyl acetate, TINUVIN® 384-2 (Ciba Specialty Chemicals) as the actinic energy radiation absorber, 0.05 part A rapid prototyping resin composition was prepared by combining components (1) and (2), mixing the mixture of (1) and (2) with component (3), then adding components (4) and (5) to the mixture, and mixing the components until uniform.

The resin composition was evaluated as in Example 1, with the results shown in Table 1 and FIGS. 1 and 2.

Example 4

The components used in this example are identified below.
(1) Alkenyl-containing organopolysiloxane of the following formula, 50 parts

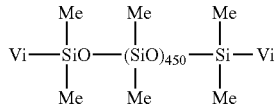

(2) Organopolysiloxane resin of three-dimensional network structure consisting of $Me_3SiO_{0.5}$, $Me_2ViSiO_{0.5}$, and $SiO_2$ units wherein molar ratio $(Me_3SiO_{0.5}+Me_2ViSiO_{0.5})/SiO_2=0.8$, with a vinyl content of 2 wt %, 50 parts
(3) Mercapto-containing organopolysiloxane of the following formula, 11 parts

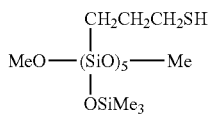

(4) 2-hydroxymethyl-1-phenylpropan-1-one, Darocure® 1173 (Ciba Specialty Chemicals) as the actinic energy radiation-sensitive radical initiator, 2 parts
(5) A 95/5 (by weight) mixture of {benzenepropanoic acid, 3-(2H-benzotriazol-2-yl)-5-(1,1-dimethylethyl)-4-hydroxy-, $C_{7-9}$ branched and linear alkyl esters} and 1-methoxy-2-propyl acetate, TINUVIN® 384-2 (Ciba Specialty Chemicals) as the actinic energy radiation absorber, 0.05 part A rapid prototyping resin composition was prepared by combining components (1) and (2), mixing the mixture of (1) and (2) with component (3), then adding components (4) and (5) to the mixture, and mixing the components until uniform.

The resin composition was evaluated as in Example 1, with the results shown in Table 1.

Example 5

The components used in this example are identified below.
(1) Alkenyl-containing organopolysiloxane of the following formula, 50 parts

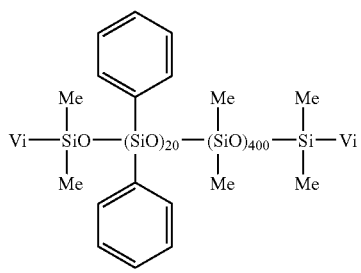

(2) Organopolysiloxane resin of three-dimensional network structure consisting of $Me_3SiO_{0.5}$, $Me_2ViSiO_{0.5}$, and $SiO_2$ units wherein molar ratio $(Me_3SiO_{0.5}+Me_2ViSiO_{0.5})/SiO_2=0.8$, with a vinyl content of 2 wt %, 50 parts
(3) Mercapto-containing organopolysiloxane of the following formula, 11 parts

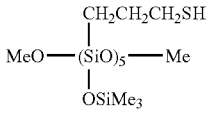

(4) 2-hydroxymethyl-1-phenylpropan-1-one, Darocure® 1173 (Ciba Specialty Chemicals) as the actinic energy radiation-sensitive radical initiator, 2 parts
(5) A 95/5 (by weight) mixture of {benzenepropanoic acid, 3-(2H-benzotriazol-2-yl)-5-(1,1-dimethylethyl)-4-hydroxy-, $C_{7-9}$ branched and linear alkyl esters} and 1-methoxy-2-propyl acetate, TINUVIN® 384-2 (Ciba Specialty Chemicals) as the actinic energy radiation absorber, 0.05 part A rapid prototyping resin composition was prepared by combining components (1) and (2), mixing the mixture of (1) and (2) with component (3), then adding components (4) and (5) to the mixture, and mixing the components until uniform.

The resin composition was evaluated as in Example 1, with the results shown in Table 1.

Comparative Example 1

The components used in this example are identified below.
(1) Alkenyl-containing organopolysiloxane of the following formula, 70 parts

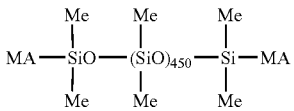

Note that MA is γ-methacryloxypropyl
(2) Organopolysiloxane resin of three-dimensional network structure consisting of $Me_3SiO_{0.5}$, $Me_2ViSiO_{0.5}$, and $SiO_2$ units wherein molar ratio $(Me_3SiO_{0.5}+Me_2ViSiO_{0.5})/SiO_2=0.8$, with a vinyl content of 2 wt %, 30 parts
(3) 2-hydroxymethyl-1-phenylpropan-1-one, Darocure® 1173 (Ciba Specialty Chemicals) as the actinic energy radiation-sensitive radical initiator, 2 parts
(4) A 95/5 (by weight) mixture of (benzenepropanoic acid, 3-(2H-benzotriazol-2-yl)-5-(1,1-dimethylethyl)-4-hydroxy-, $C_{7-9}$ branched and linear alkyl esters) and 1-methoxy-2-propyl acetate, TINUVIN® 384-2 (Ciba Specialty Chemicals) as the actinic energy radiation absorber, 0.05 part A rapid prototyping resin composition was prepared by mixing components (1) to (4). The resin composition was evaluated as in Example 1, but no satisfactory three-dimensional parts were formed.

Comparative Example 2

A rapid prototyping resin composition was prepared as in Example 1 except that the actinic energy radiation-sensitive radical initiator was omitted.

Figure 3:
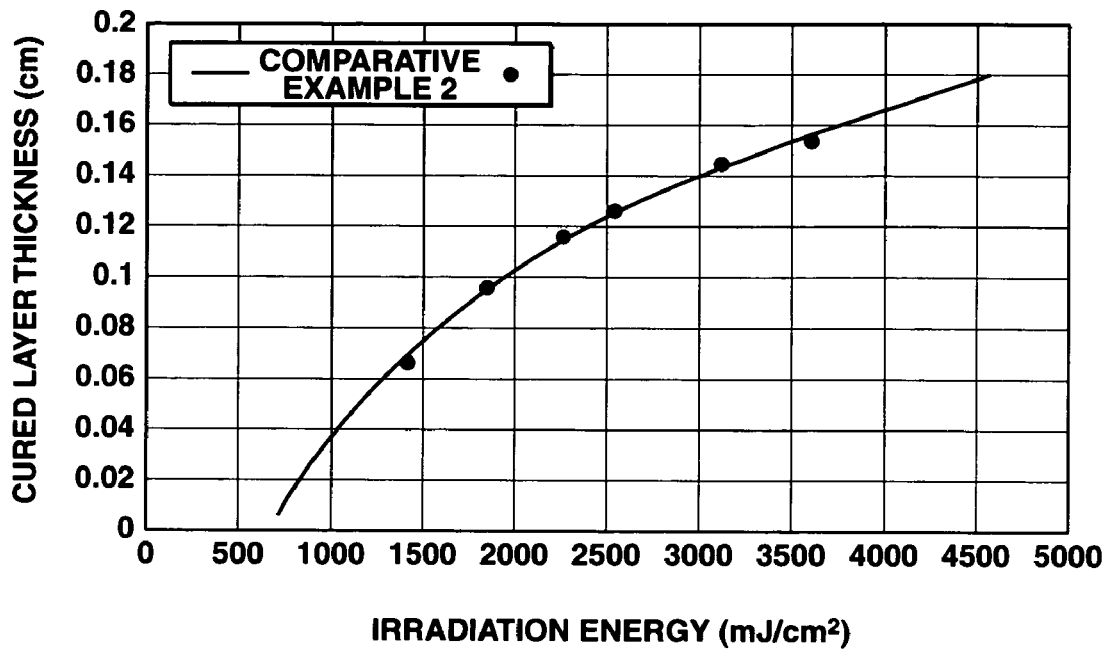
FIG. 3 is a graph plotting cured layer thickness relative to irradiation energy, illustrating the curing behavior of Comparative Example 2 with laser radiation.
Figure 4:
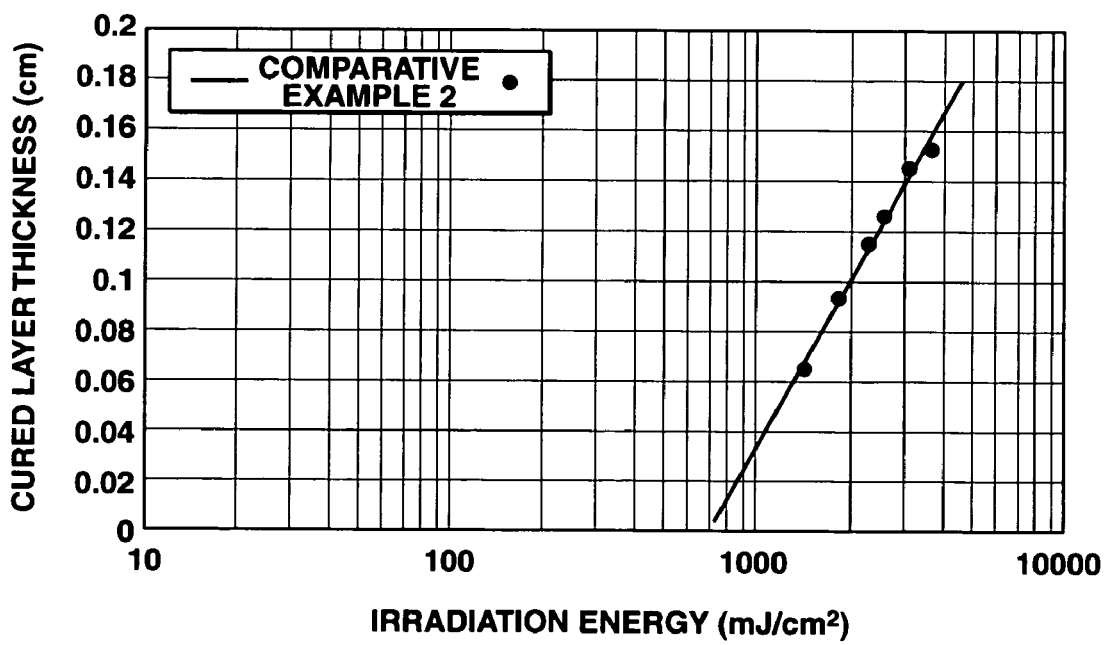
FIG. 4 is a logarithmic graph plotting cured layer thickness relative to irradiation energy, illustrating the curing behavior of Comparative Example 2 with laser radiation.

The resin composition was evaluated as in Example 1, with the results shown in Table 1 and FIGS. 3 and 4. It is seen from these graphs that although the cured depth is controllable in terms of irradiation energy, very large quantities of energy must be irradiated to form satisfactory three-dimensional parts. The composition is thus difficult to use in practice by the stereolithography technique.

Comparative Example 3

A rapid prototyping resin composition was prepared as in Example 1 except that the actinic energy radiation absorber.

The resin composition was evaluated as in Example 1, with the results shown in Table 1.

TABLE 1

|  | Example | | | | | Comparative Example | | |
| --- | --- | --- | --- | --- | --- | --- | --- | --- |
|  | 1 | 2 | 3 | 4 | 5 | 1 | 2 | 3 |
| A) Alkenyl-containing organopolysiloxane (pbw) | 70 | 70 | 70 | 50 | 50 | 70 | 70 | 70 |
| B) Mercapto-containing organopolysiloxane (pbw) | 8 | 8 | 12 | 11 | 11 | — | 8 | 8 |
| C) Alkenyl-containing MQ resin (pbw) | 30 | 30 | 30 | 50 | 50 | 30 | 30 | 30 |
| Actinic energy radiation-sensitive radical initiator (pbw) | 2 | 2 | 2 | 2 | 2 | 2 | — | 2 |
| Actinic energy radiation absorber (pbw) | 0.05 | 0.05 | 0.05 | 0.05 | 0.05 | 0.05 | 0.06 | — |
| Viscosity @25° C., mPa·s | 17,000 | 16,000 | 15,000 | 10,000 | 11,000 | 3,500 | 19,800 | 19,000 |
| Ec, mJ/cm$^2$ | 89.5 | 60.5 | 80.8 | 96 | 136 | no | 692.28 | no |
| Dp, μm | 680 | 382 | 517 | 369 | 557 | sample | 1,488 | sample |
| Tensile strength, kg/mm$^2$ | 0.15 | 0.16 | 0.14 | 0.21 | 0.17 | subject to testing could be formed | 0.13 | subject to testing could be formed |
| Young's modulus, kg/mm$^2$ | 0.17 | 0.19 | 0.08 | 0.25 | 0.11 | — | 0.05 | — |
| Elongation, % | 156 | 139 | 184 | 200 | 130 | — | 322 | — |
| Hardness as UV cured, Shore A | 48 | 50 | 42 | 45 | 48 | — | 30 | — |
| Elastic recovery, % (elongation on measurement, %) | 99 (140) | 99 (125) | 100 (166) | 98 (180) | 99 (117) | — | 100 (290) | — |
| Elastic recovery after 1 month, % | 99 | 99 | 99 | 100 | 100 | — | 100 | — |

Japanese Patent Application No. 2004-181593 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A resin composition for forming a three-dimensional object by a stereolithography technique comprising steps of selectively irradiating an ultraviolet laser beam to the surface of liquid photo-curable resin contained in a vat under the control of a computer to harden the photo-curable resin so that a photo-cured resin layer having a predetermined thickness is obtained, then supplying a layer of liquid photo-curable resin onto the cured resin layer and then likewise irradiating an ultraviolet laser beam to the liquid photo-curable resin layer to form a cured resin layer contiguous to the previous cured resin layer, and repeating said steps until a desired three-dimensional object is obtained, said resin composition comprising:
(I) an actinic energy radiation-curable silicone composition,
(II) an actinic energy radiation-sensitive polymerization initiator, and
(III) an actinic energy radiation absorber,
the actinic energy radiation-curable silicone composition (I) comprising
(A) an alkenyl-containing organopolysiloxane having the general formula (1):

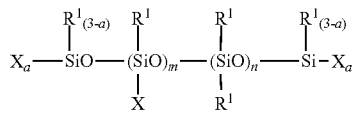

(1)

wherein $R^1$ is selected from the group consisting of methyl, ethyl, propyl, isopropyl, phenyl, 3,3,3-trifluoropropyl, and hydroxypropyl, X is selected from the group consisting of vinyl and allyl, m is an integer of at least 0, n is an integer of at least 100, a is an integer of 0 to 3, with the proviso that m is at least 1 when a=0, said organopolysiloxane containing at least X in a molecule, and the amount of X is 0.01 to 5 mol % based on the amount of X and $R^1$ combined, (B) a mercapto-containing organopolysiloxane having the general formula (2) or (3):

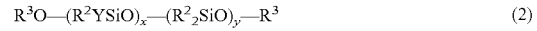

(2)

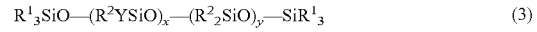

(3)

wherein $R^1$ is as defined above, $R^2$ is $R^1$, methoxy, ethoxy, propoxy, trimethylsilyloxy, or hydroxy, $R^3$ is $R^1$ or hydrogen, Y is selected from the group consisting of 2-mercaptoethyl, 3-mercapropropyl, and 4-mercaptobutyl, x is a number of 4 to 20, and y is a number of 0 to 20, in a weight ratio of (A)/(B) ranging from 85/15 to 98/2, and (C) an alkenyl-containing MQ resin comprising $R^1{}_3SiO_{0.5}$ units, $R^1{}_{(3-a)}X_aSiO_{0.5}$ units and $SiO_2$ units wherein $R^1$, X and a are as defined above, with a molar ratio of $(R^1{}_3SiO_{0.5} + R^1{}_{(3-a)}X_aSiO_{0.5})/SiO_2$ ranging from 0.6 to 1.7, in a weight ratio of (A+B)/(C) ranging from 100/100 to 100/10, the actinic energy radiation-sensitive polymerization initiator (II) being an actinic energy radiation-sensitive radical polymerization initiator selected from the group consisting of acetophenone compounds, and being present in an amount of 0.1 to 5 parts by weight per 100 parts by weight of the actinic energy radiation-curable silicone composition (I), and the actinic energy radiation absorber (III) being selected from the group consisting of benzotriazole compounds of formula (I):

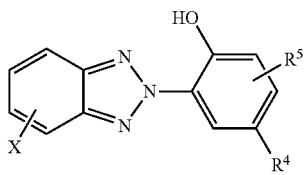

(I)

wherein $R^4$ and $R^5$ are each independently hydrogen, a substituted or unsubstituted straight or branched alkyl group of 1 to 20 carbon atoms, or a substituted or unsubstituted phenyl group, and X is a hydrogen or halogen atom; and benzophenone compounds of formula (II):

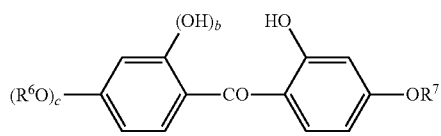

(II)

wherein $R^6$ and $R^7$ are each independently hydrogen, a substituted or unsubstituted straight or branched alkyl group of 1 to 20 carbon atoms, or a substituted or unsubstituded phenyl group, and b and c are independently 0 or 1, and being present in an amount of 0.005 to 0.25 part by weight per 100 parts by weight of the actinic energy radiation-curable silicone composition (I).

2. The resin composition of claim 1 which upon exposure to actinic energy radiation, cures into a product which exhibits such elastomeric physical properties in a tensile test according to JIS K-7113 that a specimen having the same shape and size as a dumbbell for the tensile test according to JIS K-7113 has an elongation of at least 100% and has a percent elastic recovery L0/L1 of at least 80%, provided that L0 is a length before elongation and L1 is a length after elongation.

3. The resin composition of claim 1 which upon exposure to actinic energy radiation, cures into a product which exhibits such elastomeric physical properties in a tensile test that it maintains a percent elastic recovery of at least 80% after elongation of at least 100% for a duration of at least one month.

4. The resin composition of claim 1 wherein the amount of the actinic energy radiation absorber (III) is 0.001 to 0.25 part by weight per part by weight of the polymerization initiator (II).

5. The resin composition of claim 1, wherein the weight ratio of (A)/(B) is 85/15 to 95/5.

6. The resin composition of claim 1, wherein the amount of the actinic energy radiation absorber (III) is 0.025 to 0.25 parts by weight per part by weight of the polymerization initiator (II).

7. The resin composition of claim 1, wherein the amount of the actinic energy radiation-sensitive polymerization initiator (II) is 0.5 to 5 parts by weight per 100 parts by weight of the actinic energy radiation-curable silicone composition (I), the amount of the actinic energy radiation absorber (III) is 0.01 to 0.25 parts by weight per 100 parts by weight of the actinic energy radiation-curable silicone composition (I), and the amount of the actinic energy radiation absorber (III) is 0.025 to 1 part by weight per 100 parts by weight of the polymerization initiator (II).

8. The resin composition of claim 1, wherein $R^1$ is methyl or phenyl.

9. A method of forming a three-dimensional object by a stereolithography technique comprising
irradiating actinic energy radiation to the surface of a liquid resin composition comprising
(I) an actinic energy radiation-curable silicone composition,
(II) an actinic energy radiation-sensitive polymerization initiator, and
(III) an actinic energy radiation absorber,
so as to form a cured resin layer having a predetermined pattern, then supplying an uncured layer of the liquid resin composition onto the cured resin layer, then irradiating actinic energy radiation to the liquid resin composition to form a cured resin layer contiguous to the previous cured resin layer, and repeating the laminating steps until a desired three-dimensional object is obtained,
said resin composition comprising:
(I) all actinic energy radiation-curable silicone composition,
(II) an actinic energy radiation-sensitive polymerization initiator, and
(III) an actinic energy radiation absorber,
the actinic energy radiation-curable silicone composition (I) comprising
(A) an alkenyl-containing organopolysiloxane having the general formula (1):

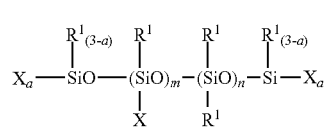

(1)

wherein $R^1$ is selected group consisting of methyl, ethyl, propyl, isopropyl, phenyl, 3,3,3-trifluoropropyl, and hydroxypropyl, X is selected from the group consisting of vinyl and allyl, m is an integer of at least 0, n is an integer of at least 100, a is an integer of 0 to 3, with the proviso that m is at least 1 when a=0, said organopolysiloxane containing at least X in a molecule, and the amount of X is 0.01 to 5 mol % based on the amount of X and $R^1$ combined,
(B) a mercapo-containing organopolysiloxane having the general formula (2) or (3):

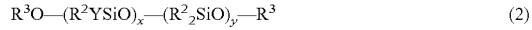

$R^3O-(R^2YSiO)_x-(R^2_2SiO)_y-R^3$ (2)

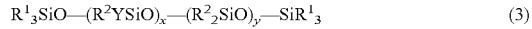

$R^1_3SiO-(R^2YSiO)_x-(R^2_2SiO)_y-SiR^1_3$ (3)

wherein $R^1$ is as defined above, $R^2$ is $R^1$, methoxy, ethoxy, propoxy, trimethylsiliyloxy, or hydroxy, $R^3$ is $R^1$ hydrogen, Y is selected from the group consisting of 2-mercaptoethyl, 3-mercaptopropyl, and 4-mercaptobutyl, x is a number of 4 to 20, and y is a number of 0 to 20, in a weight ratio of (A)/(B) ranging from 85/15 to 98/2, and
(C) an alkenyl-containing MQ resin comprising $R^1_3SiO_{0.5}$ units, $R^1_{(3-a)}X_aSiO_{0.5}$ units and $SiO_2$ units wherein $R^1$, X and a are as defined above, with a molar ratio of $(R^1_3SiO_{0.5}+R^1_{(3-a)}X_aSiO_{0.5})/SiO_2$ ranging from 0.6 to 1.7, in a weight ratio of (A+B)/(C) ranging from 100/100 to 100/10, the actinic energy radiation-sensitive polymerization initiator (II) being an actinic energy radiation-sensitive radical polymerization initiator selected from the group consisting of acetophenone compounds, and being present in an amount of 0.1 to 5 parts by weight per 100 parts by weight of the actinic energy radiation-curable silicone composition (I), and the actinic energy radiation absorber (III) being selected from the group consisting of benzotriazole compounds of formula (I):

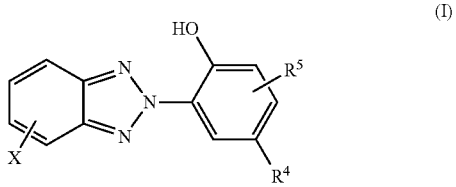

wherein $R^4$ and $R^5$ are each independently hydrogen, is substituted or unsubstituted straight or branched alkyl group of 1 to 20 carbon atoms, or a substituted or unsubstituted phenyl group, and X is a hydrogen or halogen atom; and benzophenone compounds of formula (II):

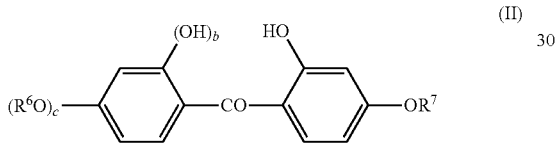

wherein $R^6$ and $R^7$ are each independently hydrogen, a substituted or unsubstituted straight or branched alkyl group of 1 to 20 carbon atoms, or a substituted or unsubstituted phenyl group, and b and c are each independently 0 or 1, and being present in an amount of 0.005 to 0.25 part by weight per 100 parts by weight of the actinic energy radiation-curable silicone composition (I).

10. The method of claim 9 wherein the resin composition, upon exposure to actinic energy radiation, cures into a product which exhibits such elastomeric physical properties in a tensile test according to JIS K-7113 that a specimen having the same shape and size as a dumbbell for the tensile test according to JIS K-7113 has an elongation of at least 100%, resumes the original shape after the tensile stress is relieved, and has a percent elastic recovery L0/L1 of at least 80%, provided that L0 is a length before elongation and L1 is a length after elongation.

11. The method of claim 9 wherein the resin composition, upon exposure to actinic energy radiation, cures into a product which exhibits such elastomeric physical properties in a tensile test that it maintains a percent elastic recovery at least 80% after elongation of at least 100% for a duration of at least one month.

12. The method of claim 9 wherein the amount of the actinic energy radiation absorber (III) is 0.001 to 0.25 part by weight per part by weight of the polymerization initiator (II).

13. The method of claim 9, wherein the weight ratio of (A)/(B) is 85/15 to 95/5.

14. The method of claim 9, wherein the amount of the actinic energy radiation absorber (III) is 0.025 to 0.25 parts by weight per part by weight of the polymerization initiator (II).

15. The method of claim 9, wherein the amount of the actinic energy radiation-sensitive polymerization initiator (II) is 0.5 to 5 parts by weight per 100 parts by weight of the actinic energy radiation-curable silicone composition (I), the amount of the actinic energy radiation absorber (III) is 0.01 to 0.25 parts by weight per 100 parts by weight of the actinic energy radiation-curable silicone composition (I), and the amount of the actinic energy radiation absorber (III) is 0.025 to 1 part by weight per 100 parts by weight of the polymerization initiator (II).

16. The method of claim 9, wherein $R^1$ is methyl or phenyl.

17. A resin composition for forming a three dimensional object by a stereolithography technique comprising steps of selectively irradiating an ultraviolet laser beam to the surface of liquid photo-curable resin contained in a vat under the control of a computer to harden the photo-curable resin so that a photo-cured resin layer having a predetermined thickness is obtained, then supplying a layer of liquid photo-curable resin onto the cured resin layer and then likewise irradiating an ultraviolet laser beam to the liquid photo-curable resin layer to form a cured resin layer contiguous to the previous cured resin layer, and repeating said steps until a desired three-dimensional object is obtained, said resin composition comprising:
(I) an actinic energy radiation-curable silicone composition,
(II) an actinic energy radiation-sensitive polymerization initiator, and
(III) an actinic energy radiation absorber;
the actinic energy radiation-curable silicone composition (I) comprising
(A) an alkenyl-containing organopolysiloxane having the general formula (1):

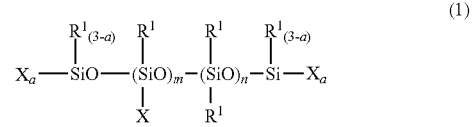

wherein $R^1$ is selected from the group consisting of methyl and phenyl, X is selected from the group consisting of vinyl and allyl, m is an integer of at least 0, n is an integer of at least 100, a is an integer of 0 to 3, with the proviso that m is at least 1 when a=0, said organopolysiloxane containing at least one X in a molecule, and the amount of X is 0.01 to 5 mol % based on the amount of X and $R^1$ combined, (B) a mercapto-containing organopolysiloxane having the general formula (2) or (3):

$$R^3O\text{---}(R^2YSiO)_x\text{---}(R^2_2SiO)_y\text{---}R^3 \qquad (2)$$

$$R^1_3SiO\text{---}(R^2YSiO)_x\text{---}(R^2_2SiO)_y\text{---}SiR^1_3 \qquad (3)$$

wherein formulae (2) and (3) are molecular formulae, $R^1$ is as defined above, $R^2$ is $R^1$, methoxy, ethoxy, propoxy, trimethylsilyloxy or hydroxy group, $R^3$ is $R^1$ or hydrogen, Y is selected from the group consisting of 2-mercaptoethyl, 3-mercaptopropyl and 4-mercaptobutyl, x is a number of 4 to 20, and y is a number of 0 to 20, in a weight ratio of (A)/(B) ranging from 85/15 to 98/2, and (C) an alkenyl-containing MQ resin comprising $R^1_3SiO_{0.5}$ units, $R^1_{(3-a)}X_aSiO_{0.5}$ units and $SiO_2$ units wherein $R^1$, X and a are as defined above, with a molar ratio of $(R^1_3SiO_{0.5}+R^1_{(3-a)}X_aSiO_{0.5})/SiO_2$ ranging from 0.6 to 1.7, in a weight ratio of (A+B)/(C ranging from 100/100 to 100/10, the actinic energy radiation-sensitive polymerization initiator (II) being an actinic energy radiation-sensitive radical polymerization initiator selected from the group consisting of 1-hydroxycyclohexyl phenyl ketone, acetophenone, 4-methylacetophenone, diethoxyacetophenone, 2-hydroxymethyl-1-phenylpropan-1-one, and 2,4,6-trimethylbenzoyldiphenylphosphine oxide, and being present in an amount of 0.1 to 5 parts by weight per 100 parts by weight of the actinic energy radiation-curable silicone composition (I), and the actinic energy radiation absorber (III) being selected from the group consisting of 2-(2'-hydroxy-5'-methylphenyl)benzotriazole, 2-[2'-hydroxy-3'-butyl-5'-(2''-carboxyoctylethyl)phenyl]benzotriazole, 2-hydroxy-4-methoxybenzophenone, 2-hydroxy-4-octyloxybenzophenone, 2-(2'-hydroxy-3'-t-butyl-5'-methylphenyl)-5-chlorobenzotriazole, 2-(2'-hydroxy-3',5'-di-t-butyiphenyl)-5-chlorobenzotriazole, 2-(2'-hydroxy-5'-t-octylphenyl)benzotriazole, {benzenepropanoic acid, 3-(2H -benzotriazol-2-yl)-5-(1,1-dimethylethyl)-4-hydroxy, $C_{7-9}$ branched and linear alkyl esters}, and mixture of {benzenepropanoic acid, 3-(2H-benzotriazol-2-yl)-5-(1,1-dimethylethyl)-4-hydroxy, $C_{7-9}$ branched and linear alkyl esters} and 1-methoxy-2-propyl acetate, and being present in an amount of 0.005 to 0.25 part by weight per 100 parts by weight of the actinic energy radiation-curable silicone composition (I).

18. The resin composition of claim 17 wherein the amount of the actinic energy radiation absorber (III) is 0.001 to 0.25 part by weight per part by weight of the polymerization initiator (II).

19. The resin composition of claim 17, wherein the amount of the actinic energy radiation absorber (III) is 0.025 to 0.25 parts by weight per part by weight of the polymerization initiator (II).

20. The resin composition of claim 17, wherein the amount of the actinic energy radiation-sensitive polymerization initiator (II) is 0.5 to 5 parts by weight per 100 parts by weight of the actinic energy radiation-curable, silicone composition (I), the amount of the actinic energy radiation absorber (III) is 0.01 to 0.25 part by weight per 100 parts by weight of the actinic energy radiation-curable silicone composition (I), and the amount of the actinic energy radiation absorber (III) is 0.025 to 1 part by weight per 100 parts by weight of the polymerization initiator (II).

21. A method of forming a three-dimensional object by a stereolithography technique comprising irradiating actinic energy radiation to the surface of a liquid resin composition comprising (I) an actinic energy radiation-curable silicone composition, (II) an actinic energy radiation-sensitive polymerization initiator, and (III) an actinic energy radiation absorber, so as to farm a cured resin layer having a predetermined pattern, then supplying an uncured layer of the liquid resin composition onto the cured resin layer, then irradiating actinic energy radiation to the liquid resin composition to farm a cured resin layer contiguous to the previous cured resin layer, and repeating the laminating steps until a desired three-dimensional object is obtained, said resin composition comprising:

(I) an actinic energy radiation-curable silicone composition, (II) an actinic energy radiation-sensitive polymerization initiator, and (III) an actinic energy radiation absorber, the actinic energy radiation-curable silicone composition (I) comprising (A) an alkenyl-containing organopolysiloxane having the general formula (1):

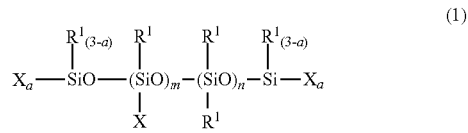

wherein $R^1$ is selected from the group consisting of methyl and phenyl, X is selected from the group consisting of vinyl and allyl, m is an integer of at least 0, n is an integer of at least 100, a is an integer of 0 to 3, with the proviso that m is at least 1 when a =0, said organopolysiloxane containing at least one X in a molecule, and the amount of X is 0.01 to 5 mol % based on the amount of X and $R^1$ combined, (B) a mercapto-containing organopolysiloxane having the general formula (2) or (3):

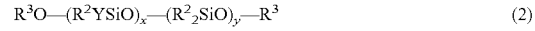

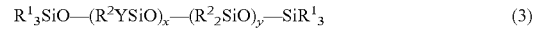

wherein formulae (2) and (3) are molecular formulae, $R^1$ is as defined above, $R^2$ $R^1$, methoxy, ethoxy, propoxy, trimethylsilyloxy or hydroxy group, $R^3$ is $R^1$ or hydrogen, Y is selected from the group consisting of 2-mercaptoethyl, 3-mercaptopropyl and 4-mercaptobutyl, x is a number of 4 to 20, and y is a number of 0 to 20, in a weight ratio of (A)/(B) ranging from 85/15 to 98/2, and (C) an alkenyl-containing MQ resin comprising $R^1_3SiO_{0.5}$ units, $R^1_{(3-a)}X_aSiO_{0.5}$ units and $SiO_2$ units wherein $R^1$, X and a are as defined above, with a molar ratio of $(R^1_3SiO_{0.5}+R^1_{(3-a)}X_aSiO_{0.5})/SiO_2$ ranging from 0.6 to 1.7, in a weight ratio of (A+B)/(C) ranging from 100/100 to 100/10, the actinic energy radiation-sensitive polymerization initiator (II) being an actinic energy radiation-sensitive radical polymerization initiator selected from the group consisting of 1-hydroxycyclohexyl phenyl ketone, acetophenone, 4-methylacetophenone, diethoxyacetophenone, 2-hydroxymethyl-1-phenylpropan-1-one, and 2,4,6-trimethylbenzoyldiphenylphosphine oxide, and being present in an amount of 0.1 to 5 parts by weight per 100 parts by weight of the actinic energy radiation-curable silicone composition (I), and the actinic energy radiation absorber (III) being selected from the group consisting of 2-(2'-hydroxy-5'-methylphenyl)benzotriazole, 2-[2'-hydroxy-3'-butyl-5'-(2''-carboxyoctylethyl)phenyl]benzotriazole, 2-hydroxy-4-methoxybenzophenone, 2-hydroxy-4-octyloxybenzophenone, 2-(2'hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-5'-t-octylphenyl)benzotriazole, {benzenepropanoic acid, 3-(2H-benzotriazol-2-yl)-5-(1,1-dimethylethyl)-4-hydroxy, $C_{7-9}$ branched and linear alkyl esters}, and mixture of {benzenepropanoic acid, 3-(2H-benzotriazol-2-yl)-5-(1,1-dimethylethyl)-4-hydroxy, $C_{7-9}$ branched and linear alkyl esters} and 1-methoxy-2-propyl acetate, and being present in an amount of 0.005 to 0.25 part by weight per 100 parts by weight of the actinic energy radiation-curable silicone composition (I).

22. The method of claim 21, wherein the amount of the actinic energy radiation absorber (III) is 0.001 to 0.25 part by weight per part by weight of the polymerization initiator (II).

23. The method of claim 21, wherein the amount of the actinic energy radiation absorber (III) is 0.025 to 0.25 parts by weight per part by weight of the polymerization initiator (II).

24. The method of claim 21, wherein the amount of the actinic energy radiation-sensitive polymerization initiator (II) is 0.5 to 5 parts by weight per 100 parts by weight of the actinic energy radiation-curable silicone composition (I), the amount of the actinic energy radiation absorber (III) is 0.01 to 0.25 parts by weight per 100 parts by weight of the actinic energy radiation-curable silicone composition (I), and the amount of the actinic energy radiation absorber (III) is 0.025 to 1 part by weight per 100 parts by weight of the polymerization initiator (II).

* * * * *